US012682590B2

(12) United States Patent
Andersen

(10) Patent No.: US 12,682,590 B2
(45) Date of Patent: Jul. 14, 2026

(54) FOOD PROCESSING DEVICE AND A METHOD OF PROVIDING IMAGES OF FOOD OBJECTS IN A FOOD PROCESSING DEVICE

(71) Applicant: MAREL SALMON A/S, Stovring (DK)

(72) Inventor: Martin Andersen, Aalborg SO (DK)

(73) Assignee: MAREL SALMON A/S, Stovring (DK)

( * ) Notice: Subject to any disclaimer, the term of this patent is extended or adjusted under 35 U.S.C. 154(b) by 0 days.

(21) Appl. No.: 17/290,441

(22) PCT Filed: Nov. 6, 2019

(86) PCT No.: PCT/EP2019/080411
§ 371 (c)(1),
(2) Date: Apr. 30, 2021

(87) PCT Pub. No.: WO2020/094726
PCT Pub. Date: May 14, 2020

(65) Prior Publication Data
US 2021/0383145 A1 Dec. 9, 2021

(30) Foreign Application Priority Data
Nov. 7, 2018 (EP) ..................................... 18204962

(51) Int. Cl.
*G06K 9/00* (2022.01)
*G06V 10/141* (2022.01)
*G06V 20/68* (2022.01)
(52) U.S. Cl.
CPC ............ *G06V 10/141* (2022.01); *G06V 20/68* (2022.01)

(58) Field of Classification Search
None
See application file for complete search history.

(56) References Cited

U.S. PATENT DOCUMENTS 4,685,569 A * 8/1987 Osaki ..................... G01N 27/60
209/559
5,315,384 A 5/1994 Heffington et al.
(Continued)

FOREIGN PATENT DOCUMENTS

CL 2017000308 A1 11/2017
CN 106133476 A 11/2016
(Continued)

OTHER PUBLICATIONS

Lee et al., "Fast surface approximation for vol. and surface area measurements using distance transform," Optical Engineering 42(10), (Oct. 1, 2003). https://doi.org/10.1117/1.1605737 (Year: 2003).*

(Continued)

*Primary Examiner* — Feng Niu
(74) *Attorney, Agent, or Firm* — Workman Nydegger

(57) ABSTRACT
A food processing device includes a conveyor forming a conveyor surface on which a food object can be conveyed in a conveying direction with a lower food surface against the conveyor surface and with an upper food surface facing away from the conveyor surface. An imaging system can analyze a field of interest on the upper food surface. The imaging system comprises a light source, a camera, and a processor. The light source and the camera are located relative to each other such that an intensity of the incident light on the field of interest do not change or do not change noticeably if the distance between the conveyor surface and the field of interest increases or decreases.

15 Claims, 5 Drawing Sheets

(56) References Cited

U.S. PATENT DOCUMENTS

| | | | | |
|---|---|---|---|---|
| 5,526,119 | A * | 6/1996 | Blit | B07C 5/3422 |
| | | | | 356/402 |
| 6,104,427 | A | 8/2000 | Stein et al. | |
| 6,775,012 | B2 * | 8/2004 | Wurz | G01B 11/00 |
| | | | | 356/623 |
| 7,310,139 | B2 * | 12/2007 | Takai | G01N 21/4795 |
| | | | | 356/237.1 |
| 7,621,806 | B2 * | 11/2009 | Bottemiller | A22C 21/003 |
| | | | | 700/173 |
| 8,233,668 | B2 * | 7/2012 | Jing | G06V 10/267 |
| | | | | 382/110 |
| 9,494,528 | B2 | 11/2016 | Matsuda | |
| 9,689,806 | B2 | 6/2017 | Matsuda | |
| 9,778,203 | B2 | 10/2017 | Matsuda | |
| 10,036,713 | B2 | 7/2018 | Matsuda | |
| 10,156,525 | B2 | 12/2018 | Matsuda | |
| 10,241,056 | B2 | 3/2019 | Matsuda | |
| 10,327,450 | B2 | 6/2019 | Petersen et al. | |
| 2001/0016053 | A1 * | 8/2001 | Dickson | G01J 3/2803 |
| | | | | 382/110 |
| 2003/0019933 | A1 * | 1/2003 | Tsikos | G02B 19/0085 |
| | | | | 235/454 |
| 2003/0042303 | A1 * | 3/2003 | Tsikos | G06K 7/10594 |
| | | | | 235/384 |
| 2005/0225752 | A1 * | 10/2005 | Takai | G01N 21/4795 |
| | | | | 356/237.1 |
| 2009/0137195 | A1 * | 5/2009 | Bottemiller | B26D 5/007 |
| | | | | 700/173 |
| 2012/0034349 | A1 * | 2/2012 | Jing | G06T 7/155 |
| | | | | 426/231 |
| 2014/0152990 | A1 * | 6/2014 | Ehbets | G01J 3/504 |
| | | | | 356/402 |
| 2015/0160128 | A1 | 6/2015 | Liu et al. | |
| 2015/0330640 | A1 * | 11/2015 | Stork genannt Wersborg | A21B 1/40 |
| | | | | 99/332 |
| 2015/0355104 | A1 | 12/2015 | Matsuda | |
| 2015/0366219 | A1 * | 12/2015 | Stork genannt Wersborg | F24C 15/008 |
| | | | | 702/136 |
| 2017/0030839 | A1 | 2/2017 | Matsuda | |
| 2017/0069098 | A1 | 3/2017 | Johannesson | |
| 2017/0245509 | A1 | 8/2017 | Petersen et al. | |
| 2017/0254758 | A1 | 9/2017 | Matsuda | |
| 2017/0350827 | A1 | 12/2017 | Matsuda | |
| 2018/0018530 | A1 | 1/2018 | Laschi | |
| 2018/0292327 | A1 | 10/2018 | Matsuda | |
| 2019/0064078 | A1 | 2/2019 | Matsuda | |
| 2020/0178543 | A1 * | 6/2020 | Stork gennant Wersborg | F24C 15/008 |
| 2021/0192713 | A1 * | 6/2021 | Sakamoto | G06T 7/0004 |
| 2021/0259256 | A1 * | 8/2021 | Stork genannt Wersborg | F24C 15/04 |

FOREIGN PATENT DOCUMENTS

| | | | | | |
|---|---|---|---|---|---|
| EP | 0569589 | A1 | 11/1993 | | |
| JP | 2000131243 | A | 5/2000 | | |
| JP | 2002082060 | A | 3/2002 | | |
| JP | 2003106995 | A | 4/2003 | | |
| JP | 2014160013 | A | 9/2014 | | |
| JP | 6403445 | B2 | 10/2018 | | |
| WO | 2005048171 | A1 | 5/2005 | | |
| WO | WO-2008016309 | A1 * | 2/2008 | | G01N 33/12 |
| WO | 2016103285 | A1 | 6/2016 | | |
| WO | WO-2017093539 | A1 * | 6/2017 | | A22B 5/007 |
| WO | 2020094726 | A1 | 5/2020 | | |

OTHER PUBLICATIONS

WO-2008016309-A1 (machine translation) (Year: 2008).*
WO-2017093539-A1 (machine translation) (Year: 2017).*
Extended European Search report from corresponding European Application No. 18204962.7, Feb. 27, 2019.
International Search Report and Written Opinion from PCT Application No. PCT/EP2019/080411, Jan. 27, 2020.
Chilean Search Report from corresponding Chilean Application No. 202100734, Jun. 13, 2022.
Japanese Office Action from corresponding JP Application No. 2021-521846, Aug. 22, 2023.
Chinese Office Action from Corresponding Chinese Patent Application No. CN201980072255.X, Jul. 24, 2024.
Chinese Office Action from Corresponding Chinese Patent Application No. CN201980072255X, Apr. 11, 2025.
Japanese Office Action from Corresponding Japanese Patent Application No. JP2021-521846, Apr. 19, 2024.

* cited by examiner

FOOD PROCESSING DEVICE AND A METHOD OF PROVIDING IMAGES OF FOOD OBJECTS IN A FOOD PROCESSING DEVICE

FIELD OF THE INVENTION

The present invention relates to a food processing device comprising a light source and a camera, and to a method of providing images of food objects in a food processing device.

BACKGROUND OF THE INVENTION

In modern food processing systems, different information related to the food is identified and recorded while the food is processed. By means of example, the origin, the weight, the size, and other characteristics may be recorded. In attempts to increase the quality of the final product, camera systems are used for identifying characteristics of the food, e.g. related to the colour of the food. Traditionally, such cameras are arranged such that a camera frame records a top view of a food object under incident artificial light. The ability to determine colour variations depends inter alia on the quality of the incident light and depends on the way the incident light is reflected onto the frame of the camera. Variations in the colour of the artificial light and variations in the distance from the light source to the surface of the food object or the distance from the surface of the food object to the camera may influence the way the camera intercepts the reflected light and thus influence the quality of the identification of the characteristic in question. This is particularly problematic in connection with identification of colour variations in food products.

DESCRIPTION OF THE INVENTION

It is an object of embodiments of the invention to provide an improved food processing device.

It is a further object of embodiments of the invention to provide an improved method of providing images and/or image data of food objects.

According to a first aspect, the invention provides a food processing device comprising a conveyor and an imaging system, wherein the conveyor forms a conveyor surface on which a food object can be conveyed in a conveying direction with a lower food surface against the conveyor surface and with an upper food surface facing away from the conveyor surface, the imaging system being configured to analyse a field of interest on the upper food surface and comprising:

a light source placed above the conveyor surface and configured to emit a light beam providing incident light on the conveyor surface and/or on the upper food surface, a camera having an optical centre line and being placed above the conveyor surface and configured for capturing a reflection of the incident light, and optionally, a processor communicating with the camera and configured to analyse the field of interest on the upper food surface based on the captured reflection.

wherein the light source and the camera are located relative to each other such that an intensity of the incident light on the field of interest do not change or do not change noticeably if the distance between the conveyor surface and the field of interest or between the light source and the field of interest increases or decreases.

The field of interest may be subjected to a reduced light intensity when the light source and the camera are located relative to each other as described above. This may be possible e.g. if a light centre with the maximum intensity from the light source is not the incident light reaching the field of interest on the upper food surface and reflected onto the camera frame.

The light source and the camera are located relative to each other such that an intensity of the incident light on the field of interest does not change or does not change noticeably if the distance between the conveyor surface and the field of interest or between the light source and the field of interest increases or decreases. This may be obtained when a light centre with the maximum intensity from the light source and an optical centre line for the camera does not intersect at the field of interest, but e.g. intersect at a location below the upper surface of food objects to be analysed, such as intersecting at a location below the conveyor belt surface.

A food processing device without a processor may be used to obtain images of surfaces of conveyed food objects. Such images may or may not be analysed. Non-analysed images can be used for quality documentation of food objects or food batches. In food processing devices with a processor, image data related to surfaces of conveyed food objects may be analysed e.g. to determine areas with colour variations on the food surface. Analysis of image data may be performed within a short time after receiving the data and making it possible e.g. to sort the transported food objects shortly after passage of the imaging system.

In the system as described herein the light source and the camera are located relative to each other such that an intensity of the incident light on the field of interest does not change or does not change noticeably if the distance between the conveyor surface and the field of interest or between the light source and the field of interest increases or decreases. When the change in incident light does not change noticeably it is meant that the change in incident light is less than 10% of the maximum light intensity, such as less than 8%, e.g. less than 6%, such as less than 4%, e.g. less than 2%. Preferably do not change noticeably is less than 5% change according to the maximum light intensity.

What is not wanted with the location of the light source and the camera as described herein, is if the incident light reaching the field of interest is emitted along a light centre with the maximum intensity and this light is reflected onto the camera frame, because then the field of interest will be subjected to an increased light intensity of the incident light when the distance between the conveyor surface and the field of interest increases. Excluded may thus be when the light source and the camera are located relative to each other such that incident light reaching the field of interest is emitted along a light centre with the maximum intensity and this light is reflected onto the camera frame.

'Reduced or increased light intensity' is determined relative to light intensity of the light centre with a maximum light intensity of the light source used in the food processing device. Even and uniform light distribution on the food object's upper surface is more important than high light intensity on this surface. The even and uniform light distribution on the food object's upper surface is most important for the field of interest determined in respect of the food objects to analyse.

When the light source and the camera are located relative to each other such that an intensity of the incident light on the field of interest do not change or do not notice-ably if the distance between the conveyor surface and the field of interest or between the light source and the field of interest increases or decreases, it becomes possible to obtain images or image data of the field of interest with similar quality independent of variation in height of the food objects conveyed. The similar quality may be determined by that the images or image data obtained by the camera that are substantially equal dark or equal light independent of the height of the food object.

Herein the invention is explained in relation to a single point at the examined food object. Corresponding explana-tions are applicable for all other points in the field of interest, where the field of interest may be a line across the conveyor surface, and thus a line across a food object being trans-ported on the conveyor.

The height of variation, within which a certain arrange-ment of the imaging system may obtain images or image data of similar quality, may be within a certain interval, such as less than 20 cm, e.g. less than 15 cm, such as less than 10 cm, e.g. less than 8 cm, such as less than 6 cm, e.g. less than 4 cm, such as less than 3 cm, e.g. less than 2 cm. The height of variation may thus correspond to the variation of the height of the food objects to analyse by the device. The height of variation may be located above the conveyor surface and being located corresponding to the difference in food height between the lowest and highest food object to be transported on the conveyor surface. Preferably the height of variation is less than 10 cm. When obtaining images or image data of e.g. surfaces of salmon fillets, the specific interval or height of variation may be less than 6 cm e.g. about 5 cm. The conveyor surface may or may not be the lowest point of a height of variation. If the lowest food object to be analysed is expected to have a height of 2 cm, the lowest point of the height of variation may be e.g. about 1 or 1.5 cm above the conveyor surface.

Due to the essentially same intensity of the reflected light captured for different heights, the variation of the food object regarding thickness has essentially no influence on the colour. When used herein, the term "colour" means a combination between light intensity and wavelength of the light.

To facilitate capturing of reflected light by the camera, the camera is placed above the conveyor surface. This position simultaneously ensures that the distance from the field of interest on the upper food surface to the camera decreases when the distance between the conveyor surface and the field of interest increases. In the present invention such a distance change has substantially no effect on the intensity of the light captured by the camera.

The light source is preferably placed before or after the camera when considered in the direction of the running conveyor surface. Further preferred, the camera is located at a location above the light source in respect of the distance to the conveyor surface.

In one embodiment, the conveyor may comprise at least one single belt, a first wheel, and a second wheel, where a single endless belt extends between the first and second wheels. In other embodiments the conveyor may comprise at least two side by side arranged endless belts, e.g. three or four side by side arranged endless belts, each belt extending side by side between first and second wheels.

The conveyor surface may thus be formed by one or more endless belts on which the food object is positioned. It should be understood, that a plurality of food objects may be conveyed one after the other. The food objects may be positioned on the conveyor surface adjacent to each other, where at least some of the food objects are in contact with a neighbouring food object. However, the food objects may be arranged at a distance to each other, e.g. at an equidistant distance or non-equidistant distance.

The conveyor surface may be of a different colour than the food object(s) being conveyed. Furthermore, the reflectance of the conveyor surface may be selected so that is it lower than the average reflectance of the food object(s) to further facilitate separation of captured reflections from the food object(s) and from the conveyor surface.

The food object is conveyed with a lower food surface against the conveyor surface and an upper food surface facing away from the conveyor surface. A part of the upper food surface may thus be perpendicular to the conveyor surface whereas other parts of the upper food surface may be transverse to the conveyor surface.

The food object(s) may be conveyed from a starting position on the conveyor surface to an end position on the conveyor surface in a conveying direction. The food object may be a fish, a part of a fish, a piece of meat, fruit, vegetables, or other types of food.

The imaging system comprises a light source, a camera, and in some embodiments also a processor. It should be understood, that these elements may be three separate ele-ments. However, in one embodiment, the processor may as an example form part of the camera. In an alternative embodiment, the processor may form part of a computer which may be responsible for the analysis of the image data.

The light source is placed above the conveyor surface and is configured to emit a light beam providing incident light on the conveyor surface and/or on the upper food surface. The light source may be positioned so that the centre of the beam is perpendicular to the conveyor surface or alternatively at an angle relative to the conveyor surface. Preferably the light beam has a width across the conveyor surface securing light on the entire width of transported food objects.

The light source may be of any type, with visible and/or non-visible electromagnetic irradiation. Preferably the light source emits visible light, such as white light. When using a light source emitting visible light, the imaging system may be screened from any light not originating from the light source. The light source may be e.g. LED, halogen, laser. The light source may emit the light as a line reaching across at least part of the conveyor surface, hereby the light source is a line light source, and may be a laser light line source.

The imaging system as described herein may comprise two light sources, e.g. one light source located before the camera and one light source located after the camera where before and after are determined in relation to the transport direction of the food object to be analysed. Each light source is preferably arranged in relation to the camera as described herein to obtain an intensity of the incident light on the field of interest such that this intensity do not change or do not change noticeably if the distance between the conveyor surface and the field of interest increases or decreases. Preferably a part of emitted light from each of the two cameras is incident light in the field of interest. When a camera has an optical central line perpendicular to the transport conveyor, the two light sources may be located mirrored to each other around this optical central line. Hereby the camera may simultaneously capture reflection of incident light from both light sources.

The camera is placed above the conveyor surface and configured for capturing a reflection of the incident light. This is achieved by arranging the camera so that a frame of the camera can capture the conveyor surface and such that the optical centre line is facing towards the conveyor surface, either perpendicular towards the conveyor surface or at an angle relative to the conveyor surface whereby the camera can capture a reflection of the incident light from the light source on the conveyor surface and/or the upper food surface. Preferably the optical centre line of the camera is perpendicular or nearly perpendicular to the conveyor surface. Here 'nearly perpendicular' means deviating less than 2 degree from perpendicular, such as less than 1.5 degree from perpendicular, e.g. less than 1 degree from perpendicular.

Herein, the term "the field of interest" defines an area in which the imaging system comprising a processor carries out the analysis in question. The field of interest may also be a line, such as a line across the food object and perpendicular to the transport direction of the conveyor surface. When the field of interest is a line, each line obtained when analysing the surface of a food object may be used for line scanning to obtain an image of a section of the upper food surface or to obtain an image of the entire upper food surface.

The field of interest may be constituted by the entire frame of the camera, or it could be a subset of the frame of the camera. Accordingly, the field of interest is a specific part of the conveyor surface and thus a specific part of the upper food surface when the food is conveyed.

The field of interest may be defined statically, one time and for all, or it could be defined dynamically by the processor, such as when the food objects are not located in a straight line when being transported, but some food objects are located to one or the other side of such a line of food objects.

Incident light on the conveyor/upper food surface is reflected, and the camera is positioned so that at least a part of the reflected light can be captured. Dependent on the size of the food object and/or variations of the upper food surface, the size of the field of interest may be varied. In one embodiment, the field of interest is constituted by a narrow, elongated stripe having a width x and a length y, and where the ratio of x:y is in the range between 1:10 and 1:10000, such as between 1:100 and 1:2000, e.g. 1:1000. The area may particularly be small, e.g. less than 1,000 mm$^2$, such as less than 500 mm$^2$, or even less than 100 mm$^2$.

The field of interest may be predefined to a specific size, whereby only a part of the captured reflection may be analysed; i.e. the part of the captured reflection originating from the predefined field of interest. The field of interest may be a line across the transported food objects where the line is perpendicular to the transport direction.

As the food object is conveyed on the conveyor surface below the camera which may be in a fixed position above the conveyor, the field of interest may move relative to the food object thereby enabling analysis of different parts of the upper food surface while the food object is being conveyed.

As the intensity of the reflected light which is captured by the camera is essentially the same for different heights of the food objects, it will be possible to identify e.g. colour variation within the field of interest and thereby enable identification of areas of the food object with potential lower quality, as these areas may have a different colour. Food objects with such identified areas may subsequently be discarded or identified areas may be cut out and subsequently be discarded.

In one embodiment, the optical centre line may intersect the centre of the field of interest. I.e. the field of interest may be defined as an area circumferential to the point at which the optical centre line intersects the upper food surface. A light beam from a line light source may have a centre line e.g. across the conveyor surface and the centre of the field of interest may then also be a line across the conveyor surface and a part of the incident light present on the food object.

The processor if present in the imaging system, may communicate with the camera and is configured to analyse the field of interest on the upper food surface based on the captured reflection. Communication between the processor and the camera may be wireless or cabled.

The light beam may provide a light centre with a maximum intensity and a light intensity which decreases with the distance from the light centre such that the intensity of light reflected from the field of interest do not change or do not change noticeably when the height of food objects changes. It may thereby be possible to arrange the light source and the camera relative to each other so that the incident light on the field of interest is not with a maximum intensity.

The intensity of the incident light may decrease continuously from the maximum light intensity at the light centre line towards a minimum light intensity away from the light centre. Furthermore, a profile of the light intensity may have an increasing slope at least in a first section between the maximum light intensity and the minimum light intensity.

In one embodiment, the light beam may be a substantially Gaussian beam with maximum intensity in the centre and an intensity decreasing with the distance to the centre in a substantially circular or elliptical shape around the light centre.

Particularly, the light source may be arranged relative to the camera such that the distance from the field of interest to the light centre increases if the distance between the conveyor surface and the field of interest increases. In that case and if the light source and the camera are positioned relative to each other as described herein, the intensity of the incident light do not change or do not change noticeably when the distance between the conveyor surface and the field of interest increases or decreases.

The optical centre line and the light source centre line may intersect the conveyor surface at different locations. Thereby it may be achieved that the intensity of the incident light at the position where the optical centre line intersects the conveyor surface or the surface of a food object on the conveyor surface is not at the maximum intensity. This may have the effect of no change in intensity of incident light on the field of interest when the distance between the conveyor surface and the field of interest is increased or decreased.

In one embodiment, the light source may comprise a line light source. In the context of the present invention, a line light source should be understood as a light source extending in a longitudinal direction and being configured to emit a light beam with a substantially constant intensity along the longitudinal direction. The line light source may emit a light centre with a maximum intensity and a light intensity which decreases with the distance from the light centre, where the light centre is a longitudinal centre along the longitudinal direction.

The line light source may be placed above the conveyor surface so that the longitudinal direction is substantially perpendicular to the conveying direction whereby a cross-section of the conveyor surface and the upper food surface is exposed to substantially the same intensity in an area perpendicular to the conveying direction.

To facilitate that the intensity of the incident light on the field of interest does not change or does not change noticeably when the distance between the conveyor surface and the field of interest increases or decreases, it may be an advantage that an angle between the light source centre line and the optical centre line is in the range of 1-20 degrees, such as 2-10 degrees, such as 4-6 degrees, e.g. about 5 degrees. When using a small angle, the camera may be located just above the light source where e.g. the cameras optical centre line is perpendicular to or nearly perpendicular to the conveyor surface and the light source is adjusted such that the light source centre line is angled to the optical centre line.

The light source and the camera may be positioned as indicated in e.g. FIG. 2 with the optical centre line being perpendicular to or nearly perpendicular to the conveyor surface, and an angle of about 5 degree between the optical centre line and the light centre with the maximum light intensity from the light source. The light source may be positioned about 323 mm above the conveyor surface, and preferably the camera is positioned further away from the conveyor surface. About 5 degree may be between e.g. 4.5 to 5.5 degrees.

In one embodiment, the light source may be placed above the conveyor surface so that the light source centre line is perpendicular to or nearly perpendicular to the conveying direction. In this embodiment, the camera may be placed so that the optical centre line forms an angle relative to the conveyor surface.

In an alternative embodiment, the camera may be place above the conveyor surface so that the optical centre line is perpendicular to or nearly perpendicular to the conveying direction. In this embodiment, the light source may be placed so that the light source centre line forms an angle relative to the conveyor surface.

It should be understood, that the camera and the light source may be placed so that both the optical centre line and the light source centre line form an angle different from 90 degrees relative to the conveyor surface.

The food processing device may further comprise an image processor configured to receive data representing the reflected light which is captured by the camera and configured to generate a 3D image profile of a food object. The image processor and the processor configured to analyse the field of interest may be a single processor. It should however, be understood that the image processor and the processor may be two separate processors.

In one embodiment, the image profile may be generated substantially simultaneously with the conveying of the food object, as the image processor may be configured to receive the data and to generate the image profile while the food object is conveyed.

The 3D image profile could be utilised for compensating the intensity of the reflected light. In that way, small light variations caused by height variations in the food object which may still occur can be compensated based on the 3D image profile.

According to a second aspect, the invention provides a method of providing images of food objects in a food processing device, the food processing device comprising a conveyor and an imaging system, wherein the conveyor forms a conveyor surface on which a food object can be conveyed in a conveying direction with a lower food surface against the conveyor surface and with an upper food surface facing away from the conveyor surface, and wherein the imaging system is configured to analyse a field of interest of the upper food surface and comprises:

a light source placed above the conveyor surface and configured to emit a light beam providing incident light on the conveyor surface and on the upper food surface;

a camera having an optical centre line and being placed above the conveyor surface and configured for capturing a reflection of the incident light; and optionally, a processor communicating with the camera and configured to analyse the field of interest on the upper food surface based on the captured reflection;

the method comprising a step of arranging the light source and the camera relative to each other such that an intensity of the incident light on the field of interest do not change or do not change noticeably if the distance between the conveyor surface and the field of interest increases or decreases.

The method of providing images of food objects in a food processing device may also be performed in a device, where the imaging system is arranged as described elsewhere herein, and without further arranging of the light source and the camera, the method may comprise Illuminating a food object, which may be under transport, with light from a light source, such that a part of incident light is reflected from a field of interest, Obtaining image or image data in the form of light reflected from the field of interest, Optionally, analysing the image data by a processor.

No change or no noticeable change in the intensity of the incident light in the field of interest when the distance between the conveyor surface and the field of interest increases or decreases may be achieved by providing an angle between the light source centre line and the optical centre line of the camera whereby the light intensity of the captured reflected light of the food object is essentially the same for different heights of the food object.

The angle between the light source centre line and the optical centre line may be at least 2 degrees, such as at least 4 degrees, such as at least 5 degrees. Angles described elsewhere herein may also be used.

If the light source and the camera are fixed according to each other in a system, and the light source and camera are located relatively to each other in an optimal setup i.e. with an optimal angle as described herein, then the entire system comprising the light source and camera may be angled in relation to the conveyor surface to perform surface analysis as described herein. However, the obtained image data seems to be best when the optical centre line of the camera is perpendicular or nearly perpendicular to the conveyor surface.

It should be understood, that a skilled person would readily recognise that any feature described in combination with the first aspect of the invention could also be combined with the second aspect of the invention, and vice versa.

The food processing device according to the first aspect of the invention is very suitable for performing the method steps according to the second aspect of the invention. The remarks set forth above in relation to the food processing device are therefore equally applicable in relation to the method.

In a third aspect, the invention provides a method for placing a light source relative to a camera in a food processing device configured to convey food objects on a conveyor surface under the light source and under the camera, wherein a plurality of test surfaces having different heights over the conveyer surface is conveyed under the camera and light source;

wherein the angle between the camera and the light source is changed while each of the plurality of test surfaces is conveyed under the camera and light source;

wherein the light intensity of the light which is reflected from the test surface is determined for different angles between the camera and the light source, and wherein an angle is selected based on a deviation between the determined light intensity, to achieve the effect that the height of the food object has only little or no influence on the light intensity of the light which is reflected onto the camera.

A plurality of test surfaces may be e.g. four test objects which all have a similar surface e.g. similar colour, and differing from each other in their height when located on the conveyor surface.

If several angles provide the effect that different heights of the test surface result in the same or nearly the same intensity of the reflected light, the angle which provides the highest intensity may be selected.

During the method for placing a light source relative to a camera the angle between the camera and the light source may be changed without moving either the light source or camera. The analysis can be performed from a digital image of e.g. a non-moving test object, where e.g. the analysis is performed in respect of a line across the surface of the test object, this line being parallel with the conveyor direction to be used during analysis of food objects. Each pixel along this line represent a different angle.

In a fourth aspect, the invention provides a food processing device comprising a conveyor and an imaging system, wherein the conveyor forms a conveyor surface on which a food object can be conveyed in a conveying direction with a lower food surface against the conveyor surface and with an upper food surface facing away from the conveyor surface, the imaging system being configured to analyse a field of interest on the upper food surface and comprising:

a light source placed above the conveyor surface and configured to emit a light beam providing incident light on the conveyor surface and on the upper food surface, a camera having an optical centre line and being placed above the conveyor surface and configured for capturing a reflection of the incident light, and a processor communicating with the camera and configured to analyse the field of interest on the upper food surface based on the captured reflection, and a sensor configured to determine an insignia for the intensity of the incident light, wherein the processor is configured to receive the captured reflection from the camera and to compensate the reflection based on the insignia.

An insignia as used herein is a measurement measured by the sensor, where the measurement may indicate a change in the intensity of the incident light at the field of interest. The insignia can be used to correlate the intensity of the incident light at the field of interest. A change in the light intensity at the field of interest may be correlated in relation to a known light intensity at a specific distance from the conveyor surface, e.g. from the conveyor surface itself i.e. the distance from the conveyor surface to the field of interest can be used for correlation of the light intensity of the incident light at the field of interest. Such a correlation may be performed in a device as described earlier herein, if some food objects to be analysed have a height not included in the height of variation of the used arrangement of light and camera.

Since the reflection is compensated based on the intensity of the incident light, the determination of colour variations becomes more exact.

The light reflection may be compensated for lower objects, as for lower objects the analysed surface is closer to the conveyor surface and thus further away from the light source, whereby the intensity of the incident light is lower in the field of interest and therefore also onto the frame of the camera. The reflection may also be compensated for higher objects, as for higher objects the analysed surface is further away from the conveyor surface and thus closer to the light source, whereby the intensity of the incident light is higher in the field of interest and therefore also onto the frame of the camera.

The sensor may e.g. be a height sensor configured to determine a distance between the conveyor surface and the field of interest. In this example, the processor is configured to receive the captured reflection from the camera and to compensate the reflection based on the distance between the conveyor surface and the field of interest determined by the height sensor. As a result, the processor may take an increased light intensity resulting from an increased height of the food product and thus a reduced distance between the light source and the food object into account when determining colour variations.

A correlation of the intensity of incident light is based on that the intensity of light is inversely proportional to the square of the distance (d). When the distance from the light source increases, the intensity of light at the field of interest is equal to a value (e.g. the light intensity at the light source) multiplied by $1/d^2$. Though such a correlation is preferably not needed if the camera and light source are located relative to each other as described herein, e.g. in the first aspect.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
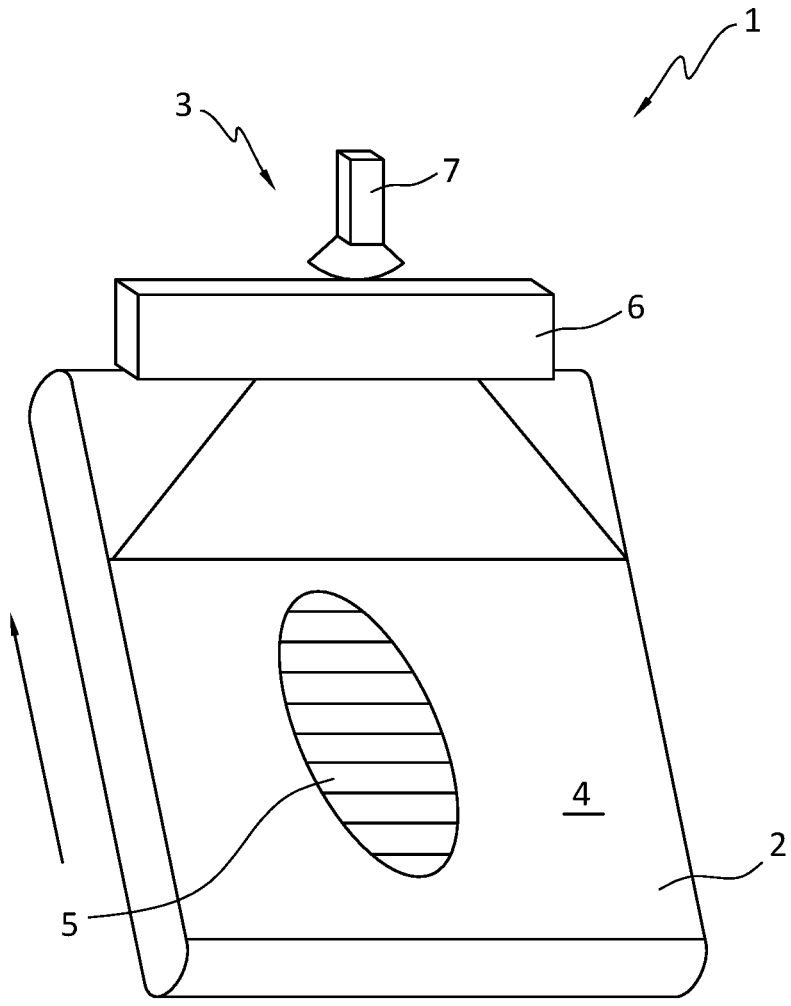
FIG. 1 illustrates an embodiment of a food processing device.

FIG. 1 illustrates an embodiment of a food processing device 1. The food processing device 1 comprises a conveyor 2 and an imaging system 3. The conveyor 2 forms a conveyor surface 4 on which a food object 5 can be conveyed in a conveying direction (indicated by the arrow) with a lower food surface against the conveyor surface 4 and with an upper food surface 5A (see FIG. 2) facing away from the conveyor surface 4.

The imaging system 3 comprises a light source 6, a camera 7, and a processor (not shown) in communication with the camera. The imaging system 3 is configured to analyse a field of interest on the upper food surface 5A.

The light source 6 in the form of a line light source is placed above the conveyor surface 4 and is configured to emit a light beam 8 (see FIG. 2) providing incident light on the conveyor surface 4 and on the upper food surface 5A.

In the illustrated embodiment, the light source 6 is in the form of a light source extending in a longitudinal direction transverse to the conveying direction and being configured to emit a light beam with a substantially constant intensity along the longitudinal direction.

The camera 7 has an optical centre line 9 (see FIG. 2) and is placed above the conveyor surface 4 and is configured for capturing a reflection of the incident light.

The processor (not shown) is communicating with the camera 7 and is configured to analyse the field of interest on the upper food surface 5A based on the captured reflection.

The light source 6 and the camera 7 are located relative to each other such that an intensity of the incident light on the field of interest does not change or does not change noticeably when the distance "d" (see FIGS. 3A and 3B) between the conveyor surface and the field of interest increases or decreases.

Figure 2:
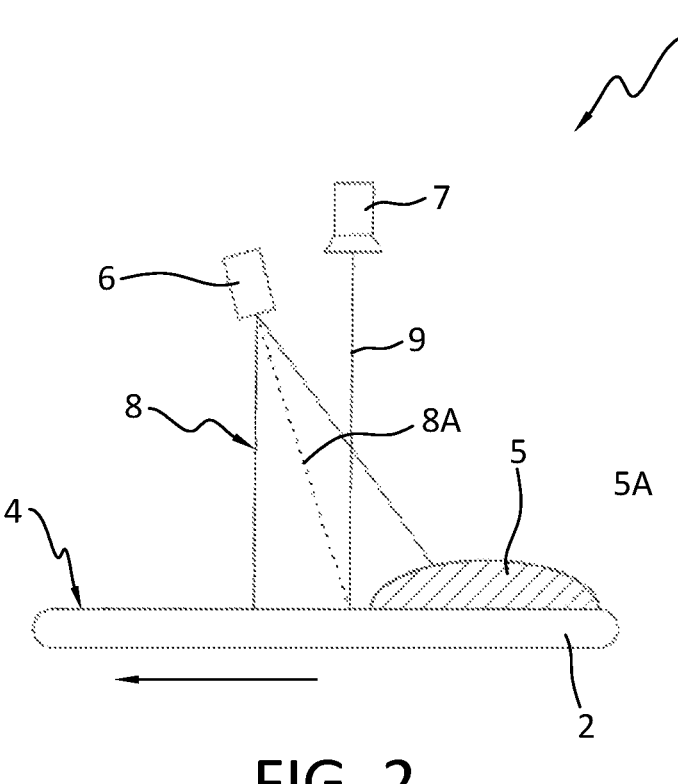
FIG. 2 illustrates another view of the food processing device illustrated in FIG. 1.

FIG. 2 illustrates another view of the food processing device 1 illustrated in FIG. 1. The food object 5 is positioned so that a part of the light beam 8 provides incident light on the upper food surface 5A. The light beam 8 provides a light centre 8A with a maximum intensity and a light intensity which decreases with the distance from the light centre. At the outer bounds 8B of the light beam, the light intensity is lowest.

In FIG. 2 it looks as if the line 8A illustrating the light centre with a maximum light intensity and the line 9 illustrating the optical centre line of the camera, intersects directly at the upper surface of the conveyor surface 4. The location where these two lines intersect may be determined in accordance with the height of the products to be analysed, such that the intersection of the optical centre line and the light centre line takes place closer to the surface of the conveyor than the height of the lowest food object to be analysed. For low food objects e.g. lower than 6 cm, preferably, the light centre with a maximum light intensity and the optical centre line would intersect (if possible) at a position below the conveyor surface, such that the optical centre line and the light source centre line intersect the conveyor surface at different locations. This may be a preferred arrangement for rather low food objects to analyse, though the intersection as indicated in FIG. 2 may also provide a proper arrangement.

As illustrated in FIG. 2, the food object 5 has not yet been conveyed so that it is below the camera 7, and consequently the optical centre line 9 is not in contact with the upper food surface 5A.

Figure 3A:
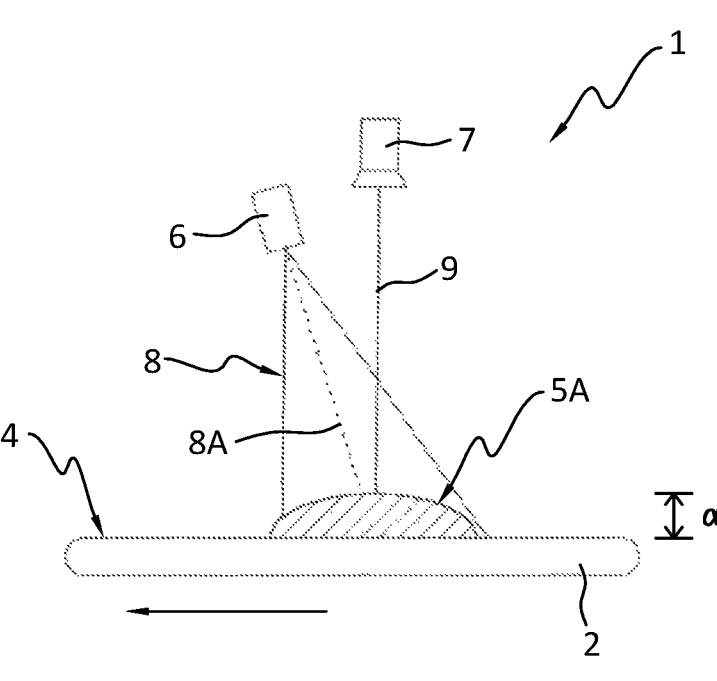
FIG. 3A illustrates a view of the food processing device illustrated in FIG. 1.

FIG. 3A illustrates another view of the food processing device 1 illustrated in FIG. 1 and FIG. 2. The food object 5 has now been conveyed so that it is below the camera 7, whereby the optical centre line 9 contacts with the upper food surface 5A, and the camera 7 can capture a reflection of the incident light.

Figures 3B, 3C:
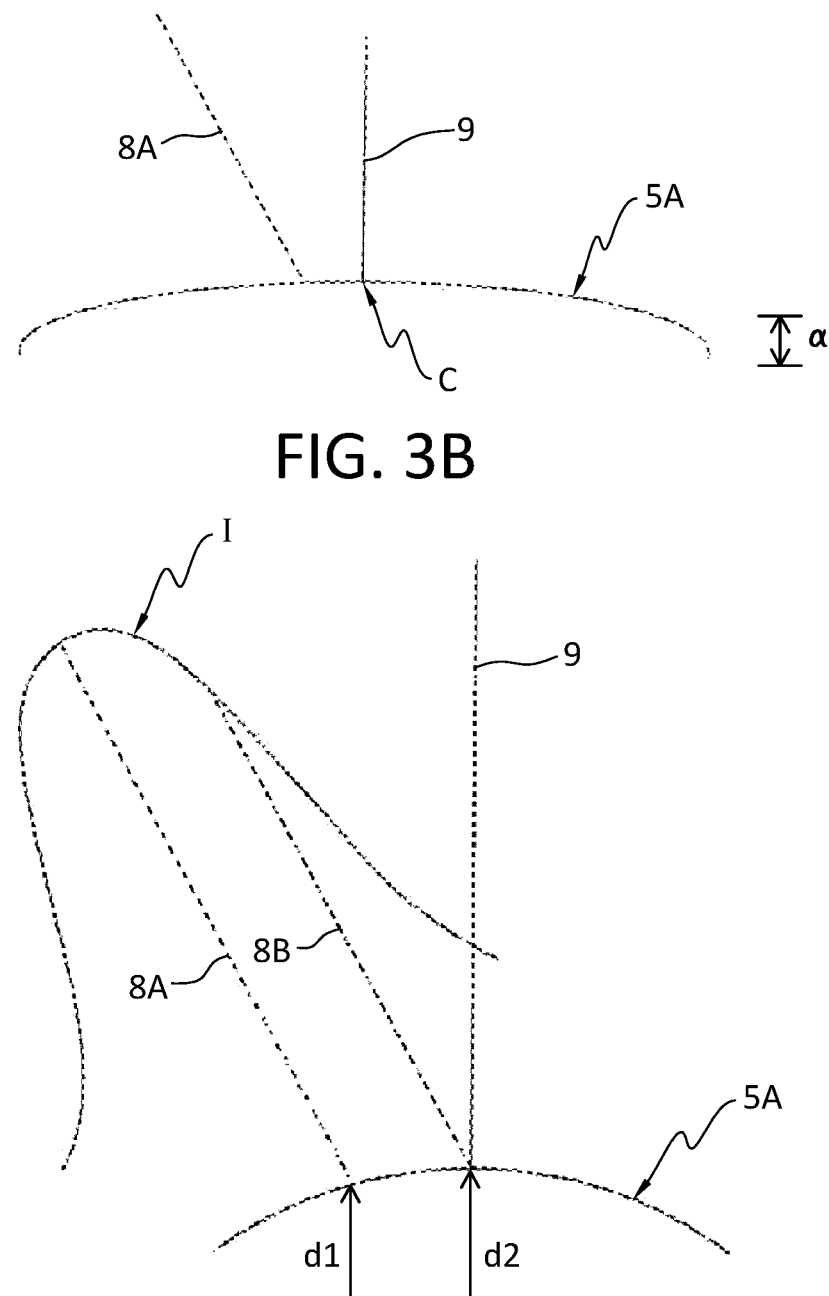
FIG. 3B illustrates a detail of FIG. 3A.
FIG. 3C illustrates the intensity of the incident light on the field of interest.

FIG. 3B illustrates a detail of FIG. 3A, the light centre 8A with the maximum intensity does not coincide or intersects with the optical centre line 9 of the camera 7 at the upper food surface 5A. This may be a relative location of the light source and the camera, where the light intensity at the field of interest does not change due to a height change of the food object on the conveyor surface.

In the illustrated embodiment, the optical centre line 9 coincides with the centre of the field of interest "C".

FIG. 3C is an enlarged view of FIG. 3B where the intensity of the incident light is illustrated by the curve I. At the light centre line 8A, the light beam has its maximum intensity illustrated by the top of the curve. The light intensity decreases with the distance to the light centre line 8A, as illustrated by the form of the curve I. Consequently, the intensity of the incident light 8B at the upper food surface below the optical centre line 9 of the camera is lower than at the light centre line 8A. The top point of the distance d2 illustrates the field of interest and the top point of the distance d1 illustrates the location where the centre line with the maximum intensity reaches the food object surface 5A.

Figures 4, 5:
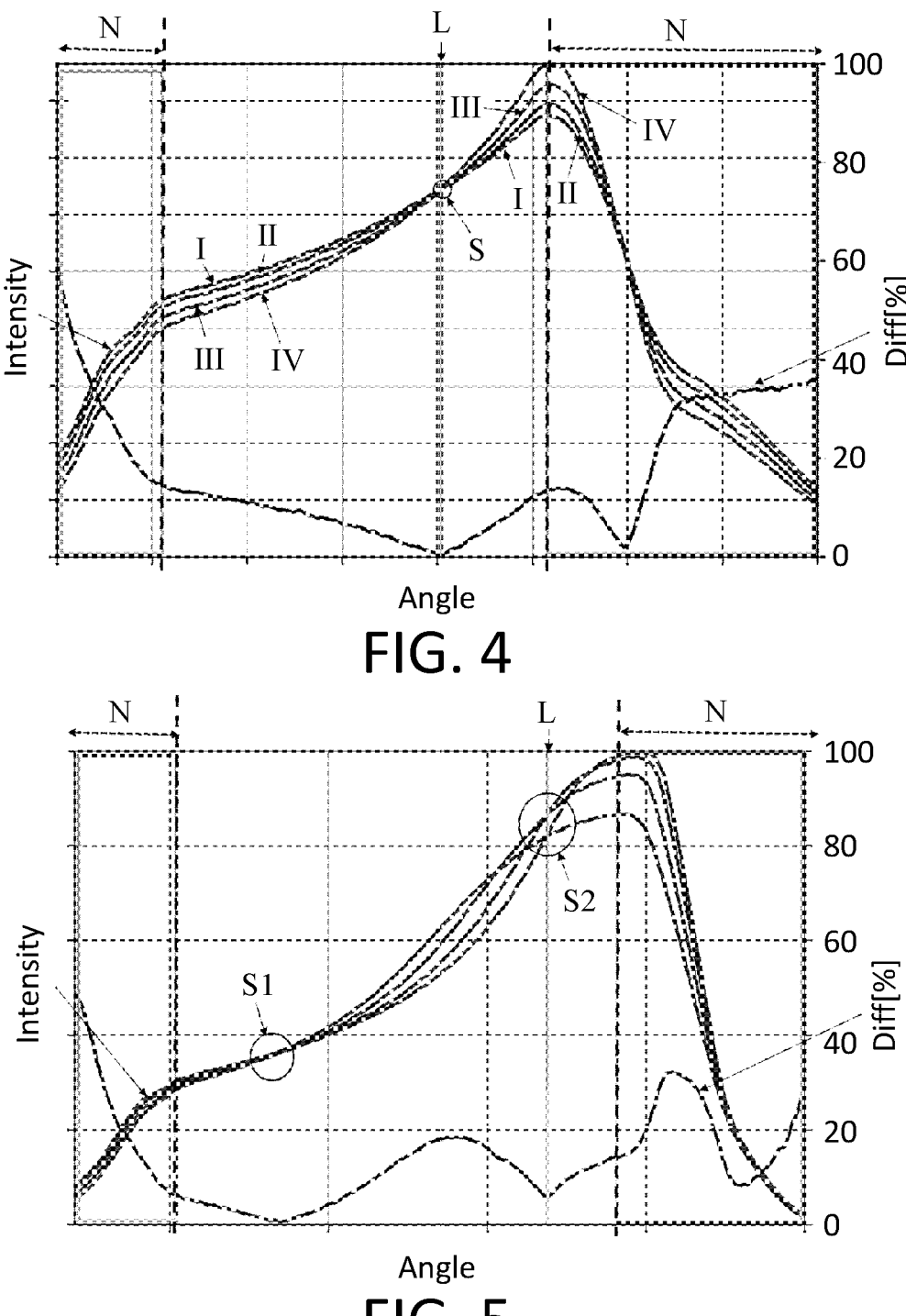
FIG. 4 is illustrating graphs of light intensity of light captured by the camera.
FIG. 5 is illustrating other graphs of light intensity of light captured by the camera.

FIGS. 4 and 5 are two different groups of graphs illustrating light intensity of light captured by the camera 7. Four different test objects were used. The graph relating to these test objects are indicated by I, II, III and IV in FIG. 4. The test objects differ in their height, I being the lowest and IV being the highest. All graphs illustrate the light intensity as a function of the angle between the light centre line and the optical centre line of the camera. The two figures illustrate the optimal line scanning position on two different camera mountings, which is indicated by the line marked "L", the parts marked with "N" and the dotted vertical lines are areas of noise. For the area of noise in the right part of the figures this is a result of a shielding by the light source of the reflected light i.e. at least some of the reflected light is blocked from reaching the frame of the camera. The areas of noise should not be used when looking for an optimal angle between the camera's optical centre line and the light centre line from the light source. For each height of a (food) object the intensity of the light received by the camera is indicated in relation to an angle between the optical centre line and the light centre line. The difference (Diff) as indicated by one line (the lower line) indicates the difference (in %) between the upper and lower graph illustrating intensity of light received by the camera.

The graphs can be used in a method for placing the light source relative to the camera to achieve the effect that the height of the food object has only little or no influence on the light intensity of the light which is reflected onto the camera.

In each of FIGS. 4 and 5 the four different graphs illustrate four different heights of food objects, e.g. derived from four different pieces of meat. For the illustrated graphs four similar objects only differing in height were used. The objects had a straight surface and were of similar and uniform colour. The lowest object was 0.3 cm in height (marked I in FIG. 4) and the highest object was 6 cm in height (marked IV in FIG. 4). For each object 4 cm were analysed, corresponding to the analysed length (=the X-axis for the graphs) and illustrating the angle between the light centre from the light source and the optical centre line of the camera. Each graph illustrates one line along the analysed object, this line being parallel to the transport direction of the conveyor belt.

In each of the figures, the angle (corresponding to a specific relative location of the light source and the camera) is selected where all four different heights of the objects provide near of completely same light intensity captured by the camera, this point or area is marked by "S", "S1" and "S2". In FIG. 4, only one angle provides this effect, as the areas of noise should be ignored. This angle is identified by the vertical line "L". In FIG. 5, two different angles provide a near of completely identical light intensity captured by the camera, this is marked by S1 and S2 on the graphs. In this case, the lower angle (indicated on the graphs with S1), however, provides a lower intensity than the larger angle (indicated on the graphs with S2) and which is illustrated by the vertical line "L". When determining the angle between the light source and the camera providing a near of completely identical light intensity captured by the camera, the lower line ('Diff') indicated as difference in intensity between the uppermost and the lowermost graphs, can be used by looking for a local minimum, which indicates low difference between the graphs illustrating intensity of incident light reflected from the objects.

When determining the position of the light source and the camera according to the invention described herein, results as illustrated in FIG. 4 indicates an optimal setup with the light source and the camera located relative to each other at the specific angle where the four graphs intersect each other, this is indicated by the camera position marked L. If a result is obtained as illustrated in FIG. 5 where the graphs only intersect each other in S1 and at a low light intensity, which may be too low, and the graphs only intersect each other e.g. two at a time, as indicated at S2, this may indicate a suboptimal setup of the light source and the camera, and a different setup could be tried, which may include a different angle between the light source and the camera and/or a different distance from the light source and/or the camera to the conveyor surface and/or a light source with a different light distribution.

The imaging system may include a computer processor configured to determine the angle providing the largest intensity and smallest deviation with regard to light intensity captured for different heights of the food object over a conveyor surface.

Figure 6A:
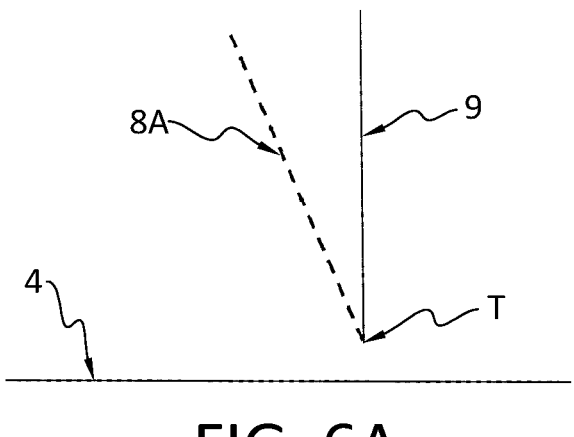
FIGS. 6*a-c* illustrate different possibilities of the location of the intersection of the optical centre line and the light source centre line.
Figure 6B:
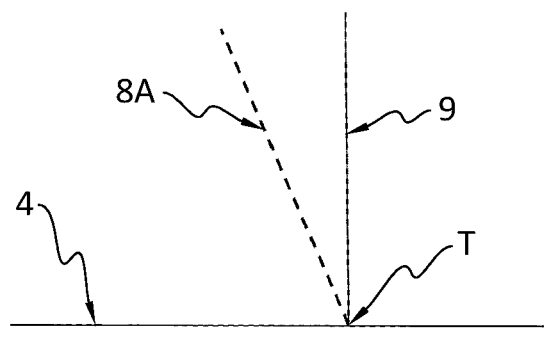
Figure 6C:
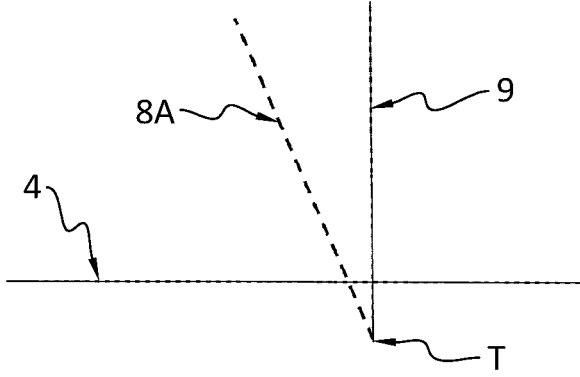

FIG. 6 illustrates different possibilities of the location of the intersection "T" of the optical centre line 9 and the light source centre line 8A relative to the conveyor surface 4. The intersection T may be located above (FIG. 6A), at (FIG. 6B) or below (FIG. 6C) the conveyor surface 4. Corresponding figures can be made with food objects positioned onto the conveyor surface and where the intersection of the optical centre line 9 and the light source centre line 8A may be located above, at or below the food object on the conveyor surface. Where the intersection between the light source centre line 8A and the optical centre line 9 should be located can be determined in relation to the height of the food objects to be analysed and such that the intersection preferably at all times stays below the lowest point to analyse a food surface i.e. the intersection should preferably be located below a field of interest and preferably below a field of interest of the lowest food object which is to be analysed. An intersection below the conveyor surface as indicated in FIG. 6C may be used for very low food objects, an intersection at the conveyor surface as indicated in FIG. 6B may be used for low food objects, and an intersection above the conveyor surface as indicated in FIG. 6A may be used for higher food objects.

The invention claimed is:

1. A food processing device comprising a conveyor and an imaging system,
   wherein the conveyor forms a conveyor surface on which a food object can be conveyed in a conveying direction with a lower food surface against the conveyor surface and with an upper food surface facing away from the conveyor surface, the imaging system being configured to obtain images and to analyze a field of interest on the upper food surface and comprising:

a light source placed above the conveyor surface and configured to emit a light beam providing incident light on the conveyor surface and/or on the upper food surface,
   a camera having an optical center line and being placed above the conveyor surface and configured for capturing a reflection of the incident light, and
   a processor communicating with the camera and configured to analyze the field of interest on the upper food surface based on the captured reflection,
   wherein the light source is positioned to emit a maximum intensity along a light source center line;
   wherein an angle between the light source center line emitted from the light source and the optical center line is less than 20 degrees;
   wherein the field of interest is defined as a line across the food object and across to the conveying direction;
   wherein at the angle, a variation of reflected incident light from the field of interest, which is captured by the camera, reaches a minimum when a distance between the conveyor surface, or the light source, and the field of interest increases or decreases within an interval corresponding to height variation of the food object and between food objects; and
   wherein the interval is less than 20 cm.

2. The food processing device according to claim 1, wherein the optical center line and a light source center line from the light source intersect at a location below the upper surface of the food object.

3. The food processing device according to claim 1, wherein the light source center line is perpendicular to the conveying direction.

4. The food processing device according to claim 1, wherein the optical center line is perpendicular to the conveying direction.

5. The food processing device according to claim 1, wherein the angle between the light source center line and the optical center line is at least 0.5 degrees.

6. The food processing device according to claim 1, comprising a processor and/or an image processor configured to receive data representing the reflected light which is captured by the camera and to determine color and/or light intensity and/or color variation and/or light intensity variation of a food object.

7. The food processing device according to claim 1, comprising an image processor configured to receive data representing the reflected light which is captured by the camera and to generate a 3D image profile of a food object.

8. The food processing device according to claim 7, wherein the processor and/or the image processor is configured to receive data and analyze image data while the food object is conveyed.

9. A method of providing images of food objects in a food processing device, the food processing device comprising a conveyor and an imaging system, wherein the conveyor forms a conveyor surface on which a food object can be conveyed in a conveying direction with a lower food surface against the conveyor surface and with an upper food surface facing away from the conveyor surface, and wherein the imaging system is configured to analyze a field of interest of the upper food surface, the method comprising:
   arranging a light source of the imaging system above the conveyor surface;
   emitting a light beam from the light source to provide incident light on the conveyor surface and on the upper food surface;

arranging a camera above the conveyor surface for capturing a reflection of the incident light, the camera having an optical center line; and using a processor communicating with the camera, analyzing the field of interest on the upper food surface based on the captured reflection;

wherein the light source is positioned to emit a maximum intensity along a light source center line;

wherein an angle between the light source center line emitted from the light source and the optical center line is less than 20 degrees;

wherein the field of interest is defined as a line across the food object and across to the conveying direction;

wherein at the angle, a variation of reflected incident light from the field of interest, which is captured by the camera, reaches a minimum when a distance between the conveyor surface, or the light source, and the field of interest increases or decreases within an interval corresponding to height variation of the food object and between food objects; and wherein the interval is less than 20 cm.

10. The food processing device according to claim 1, wherein the camera is positioned at a greater distance away from the conveyor surface than the light source, the camera being downstream from the light source.

11. The food processing device according to claim 1, wherein the field of interest is configured to move relative to the food object to analyze different parts of the upper food surface while the food object is being conveyed.

12. The food processing device of claim 1, wherein the imaging system is screened from ambient light not originating from the light source.

13. The food processing device of claim 1, wherein at least some of the reflected light is blocked from reaching a frame of the camera by a shielding.

14. The food processing device of claim 1, wherein the light beam is a Gaussian beam having the maximum intensity along the light source center line.

15. The food processing device of claim 1, wherein the conveyor surface has a reflectance lower than an average reflectance of the food object.

* * * * *